US007652804B2

(12) United States Patent
Matsui et al.

(10) Patent No.: US 7,652,804 B2
(45) Date of Patent: Jan. 26, 2010

(54) IMAGE FORMING APPARATUS CAPABLE OF EFFICIENTLY CONTROLLING LIGHT RADIATION TO READ AN IMAGE

(75) Inventors: Hideaki Matsui, Tokyo (JP); Susumu Mikajiri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 454 days.

(21) Appl. No.: 11/485,366

(22) Filed: Jul. 13, 2006

(65) Prior Publication Data

US 2007/0019256 A1 Jan. 25, 2007

(30) Foreign Application Priority Data

Jul. 15, 2005 (JP) ............................ 2005-206928

(51) Int. Cl.
*H04N 1/04* (2006.01)

(52) U.S. Cl. ........................ 358/475; 358/474; 358/497

(58) Field of Classification Search ................ 358/475, 358/497, 484, 483, 482, 474, 487, 509, 505, 358/506; 399/220, 221, 211, 212; 250/578.1, 250/234–236, 239, 216, 208.1; 355/67, 68, 355/70, 71; 362/609–615
See application file for complete search history.

(56) References Cited

U.S. PATENT DOCUMENTS 4,682,042 A * 7/1987 Igarashi .................. 250/208.1
4,816,875 A 3/1989 Takeda et al.
4,954,862 A 9/1990 Lee et al.
6,299,328 B1 10/2001 Wilson et al.
2006/0092617 A1* 5/2006 Mikajiri et al. ............... 362/11

FOREIGN PATENT DOCUMENTS

JP 52126241 10/1977
JP 56126863 10/1981
JP 64058165 A * 3/1989
JP 09034027 2/1997
JP 11-196231 7/1999
JP 2004-070187 3/2004

OTHER PUBLICATIONS

European Office Action issued for corresponding case No. 06014594.3.

* cited by examiner

*Primary Examiner*—Cheukfan Lee
(74) *Attorney, Agent, or Firm*—Harness, Dickey & Pierce, P.L.C.

(57) ABSTRACT

An image forming apparatus, capable of efficiently controlling light radiation to read an image, includes at least one lighting tube and at least one reflector. Each one of the lighting tubes includes an aperture. Each one of the reflectors is arranged at a position in a vicinity to and corresponding to the lighting tube on a one-to-one basis. Each one of the reflectors is configured to gather light emitted through the aperture by the corresponding lighting tube to focus the light on a point in a reading area in a surface of an original document to be read. Each one of the reflectors includes an elliptical shape.

11 Claims, 7 Drawing Sheets

IMAGE FORMING APPARATUS CAPABLE OF EFFICIENTLY CONTROLLING LIGHT RADIATION TO READ AN IMAGE

PRIORITY STATEMENT

This patent specification is based on Japanese patent application, No. 2005-206928 filed on Jul. 15, 2005 in the Japan Patent Office, the entire contents of which are incorporated by reference herein.

BACKGROUND

1. Field

The present invention generally relates to an image forming apparatus, and more particularly to an image forming apparatus capable of efficiently controlling light radiation to read an image with a symmetrical light reflection system.

2. Discussion of the Background

A conventional background image forming apparatus such as a copying machine uses an image scanner to read an image of an original document. Such an image scanner generally use a light source having a length sufficient to cover a width of the original document to be read. The light source may be a fluorescent lamp such as, for example, a xenon arc lamp having a diameter of the order of 10 mm. In comparison with a halogen lamp, for example, the xenon arc lamp generally has a lower luminance but a wider light emitting area. Therefore, the xenon arc lamp emits a greater amount of light, resulting in a high light emission rate on an electrical power consumption.

The light emission amount is in proportion almost to an area having a fluorescent coating. Therefore, the light emission amount can be increased by increasing a diameter of the glass tube to enlarge the fluorescent coated area. This approach, however, results in upsizing of the image scanner.

FIG. 1 illustrates a major portion of an example image scanner 100 used in the conventional background image forming apparatus. FIG. 2 illustrates a structure of a xenon arc lamp used in the image scanner 100 of FIG. 1. As illustrated in FIG. 1, the image scanner 100 includes a xenon arc lamp 101, a reflector 102, a contact glass 103, and a mirror 104. The xenon arc lamp 101 includes a transparent glass tube 111 with a thickness of the order of from approximately 0.5 mm to approximately 1 mm. The transparent glass tube 111 includes an internal surface 112 covered with a fluorescent coating and an aperture 113 having an angle θ, and is filled with a xenon gas. The transparent glass tube 111 further includes a pair of electrodes 114 and 115 which are disposed at positions facing each other relative to a center of the transparent glass tube.

When an alternating voltage of a few hundred volts is applied to the pair of electrodes 114 and 115, an electric discharge is caused inside the glass tube. The transparent glass tube 111 generates a ultraviolet radiation when an electron running by the electric discharge collides with an atom of xenon inside the transparent glass tube 111. The ultraviolet rays then impinges on the fluorescent coating of the internal surface 112 and, at this moment, the fluorescent coating is energized to output a visible radiation which is discharged outside through the aperture 113. A part of the visible radiation goes through the aperture 113 to the reflector 102 and is reflected by the reflector 102 toward a point in an area a on the contact glass 103, as indicated by a line L1. Another part of the visible radiation goes through the aperture 113 directly to a point in the area a, as indicated by a line L2. Further another part of the visible radiation goes through the aperture 113 directly to a point in an area b on the contact glass 103. The light radiation to the area b is, however, undesirable.

The reflected light from the points in the area a is forwarded to the mirror 104 and is reflected by the mirror 104 toward other optical components (not shown), as indicated by a line L3. The light is finally directed to an imaging lens and an image pickup device such as a CCD (charge-coupled device) which reads the light as image information.

The xenon arc lamp, however, cannot generate a sufficient light amount in a case of a productivity and high-speed image forming apparatus such as a high-speed full-color scanner, for example, which needs a greater amount of light radiation to read images at a high speed. To increase a light radiation, it is needed to increase an area of the internal surface 112 covered with the fluorescent coating. This leads an increase of a diameter of the transparent glass tube 111 and also a size of the reflector 102, resulting in upsizing of the image scanner 100.

SUMMARY

This patent specification describes an image forming apparatus capable of efficiently controlling light radiation to read an image. In one example embodiment, an image forming apparatus includes at least one lighting tube and at least one reflector. Each one of the lighting tubes includes an aperture. Each one of the reflectors is arranged at a position in a vicinity to and corresponding to the lighting tube on a one-to-one basis. Each one of the reflector is configured to gather light emitted through the aperture by the corresponding lighting tube to focus the light on a point in a reading area in a surface of an original document to be read. Each one of the reflectors having an elliptical shape.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein.

DETAILED DESCRIPTION OF EXAMPLE EMBODIMENTS

Figure 1:
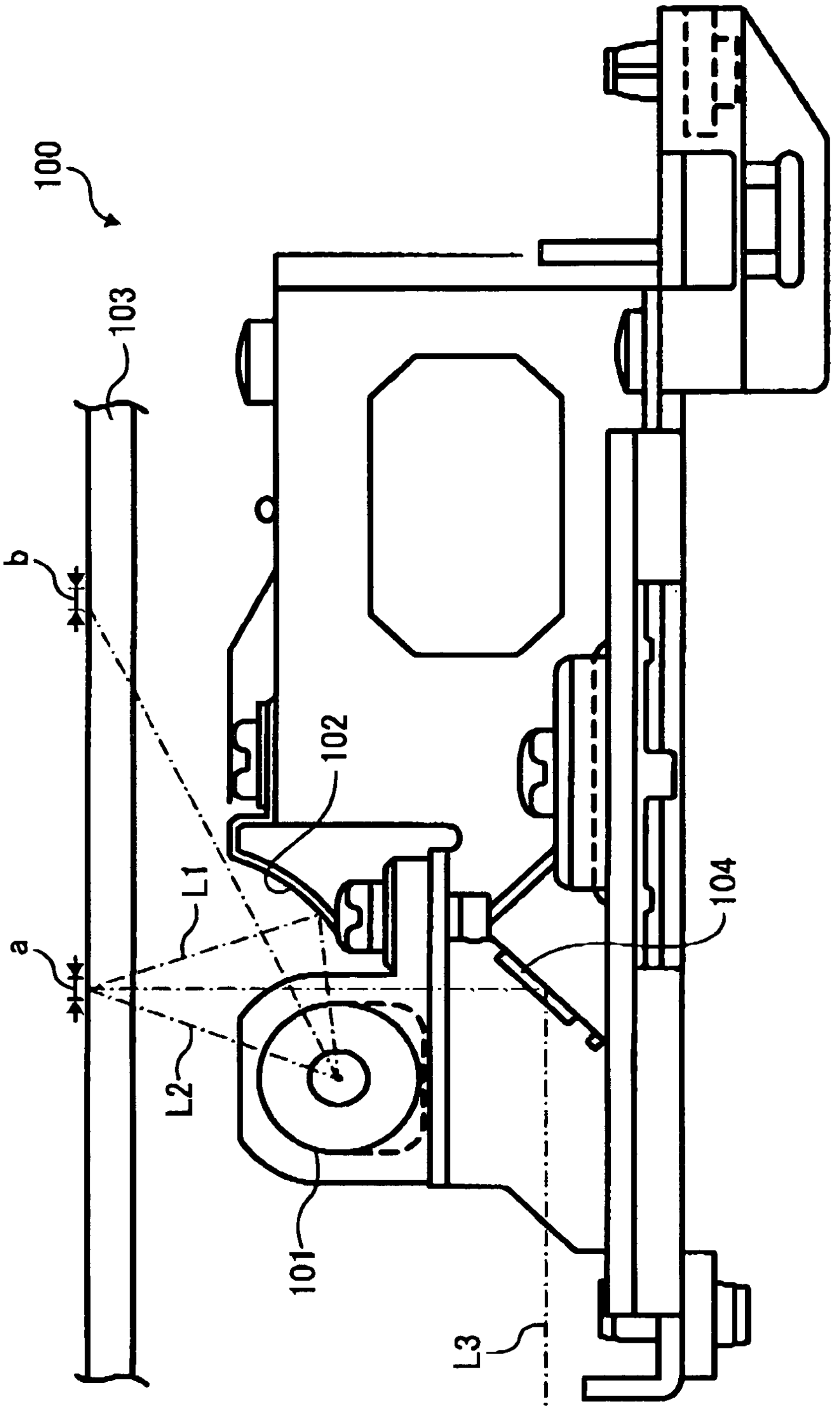
FIG. 1 PRIOR ART
FIG. 1 is schematic diagram of a major portion of a background image reading apparatus.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a copying machine 1 is explained as one example of an electrophotographic image forming apparatus according to an example embodiment of the present invention. The copying machine 1 of FIG. 3 may be a black and white copying machine or a full-color copying machine. Also, the copying machine 1 of FIG. 3 may be a copy-fax-print combination machine generally called a multi-function printer.

Figure 3:
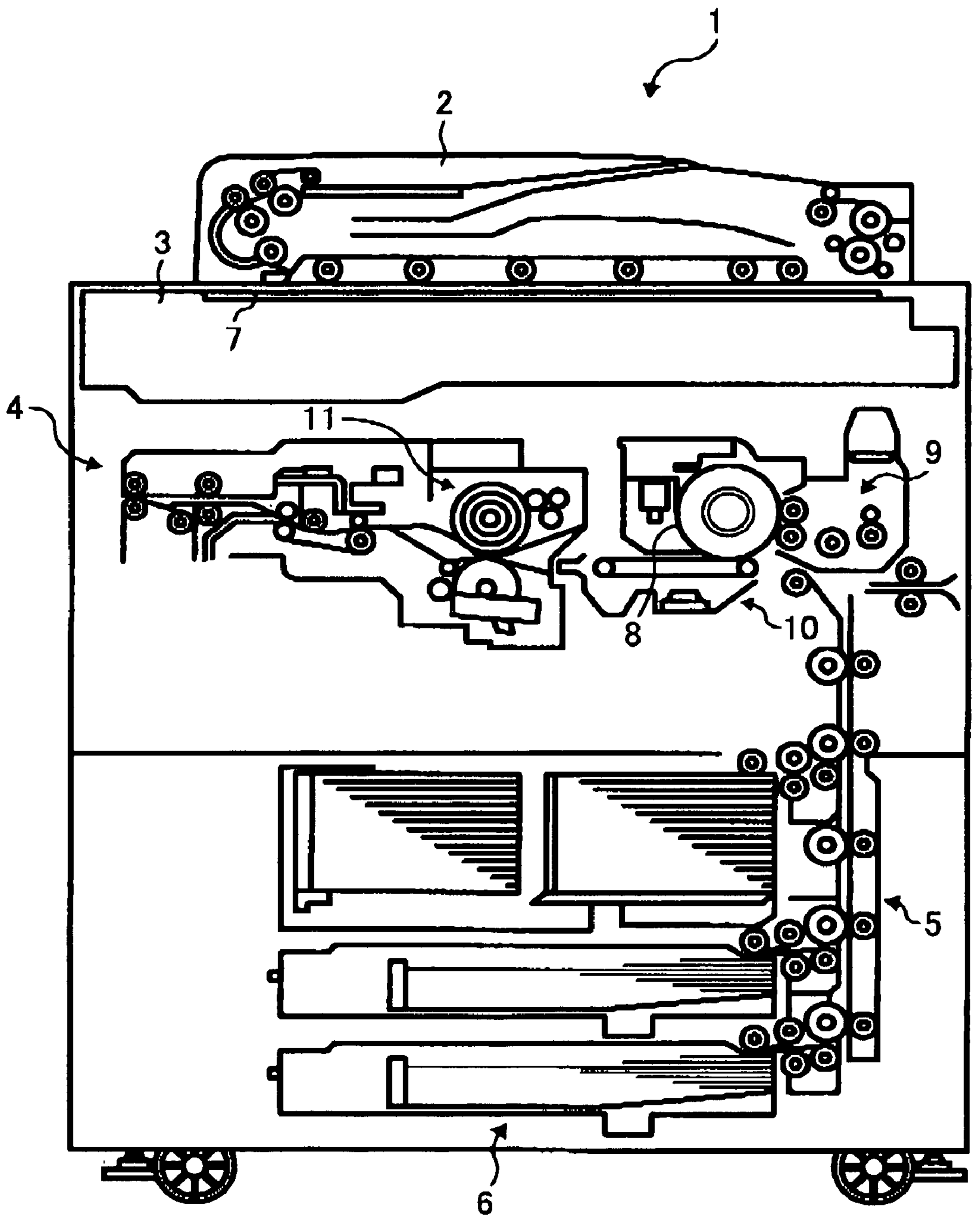
FIG. 3 is a schematic diagram of an image forming apparatus of an example embodiment of the present invention.

As illustrated in FIG. 3, the copying machine 1 includes an ADF (automatic document feeder) 2, an image scanner 3, an electrophotographic image forming unit 4, a sheet supply unit 5, and a sheet path 6. The image scanner 3 includes a contact glass 7. The electrophotographic image forming unit 4 includes a photosensitive drum 8, an image development unit 9, an image transfer unit 10, an image fixing unit 11.

The ADF 2 is arranged on the image scanner 3 to perform an image reading in cooperation with the image scanner 3. The ADF 2 provides a sheet tray to place original documents to be read and transports them sheet by sheet to a reading position on the contact glass 7 of the image scanner 3. The image scanner 3 optically reads an image of an original document placed at the reading position and optically outputs image data of the read original document. Specifically, this optical output is in a form of a light beam.

The electrophotographic image forming unit 4 is disposed under the image scanner 3 and is arranged in accordance with an electrophotographic system. Specifically, the photosensitive drum 8 is substantially centered and is surrounded by various constituents including the image development unit 9, the image transfer unit 10, and the image fixing unit 11 in a predefined order.

The photosensitive drum 8 has a rotary surface which is evenly charged and photosensitive. The photosensitive drum 8 is arranged at a position to be exposed to the light beam from the image scanner 3. When the photosensitive drum 8 is rotated and is exposed to the light beam, an electrostatic latent image is sequentially formed in accordance with the image data on the surface of the photosensitive drum 8.

The image development unit 9 contains a development agent including toner and is arranged in close vicinity to the rotary surface of the photosensitive drum 8. As the photosensitive drum 8 rotates, the image development unit 9 sequentially develops the electrostatic latent image formed on the photosensitive drum 8 into a visual image with toner.

The image transfer unit 10 is arranged at a position in a close vicinity to the photosensitive drum 8 and downstream from the image development unit 9 in a rotation direction of the photosensitive drum 8. The image transfer unit 10 forms a gap against the surface of the photosensitive drum 8 and provides an electrostatic image transfer region relative to the gap. This gap between the image transfer unit 10 and the photosensitive drum 8 forms a part of a sheet passage following the sheet path 6 through which a recording sheet fed from the sheet supply unit 5 is caused to pass. The image transfer unit 10 performs an image transfer in synchronism with travels of the toner image on the photosensitive drum 8 and the recording sheet to the electrostatic image transfer region. As a result of the image transfer, the toner image is transferred onto the recording sheet.

The image fixing unit 11 is disposed at a position to receive the recording sheet coming out from the electrostatic image transfer region. The image fixing unit 11 fixes the toner image on the recording medium with heat and pressure, for example. The recording sheet exiting from the image fixing unit 11 is ejected into an output tray (not shown).

The sheet supply unit 5 is disposed at a position under the electrophotographic image forming unit 4 and contains a relatively large number of recording sheets. The sheet supply unit 5 sends out the recording sheets one by one to the electrophotographic image forming unit 4. The sheet supply unit 5 may contain recording sheets in different sizes at a time so as to allow a user selection of a recording sheet in a desired size to print.

The sheet path 6 provides a passage connecting the sheet supply unit 5 to the electrophotographic image forming unit 4 so as to transport the recording sheet discharged from the sheet supply unit 5 to the electrostatic image transfer region of the electrophotographic image forming unit 4.

Figure 4:
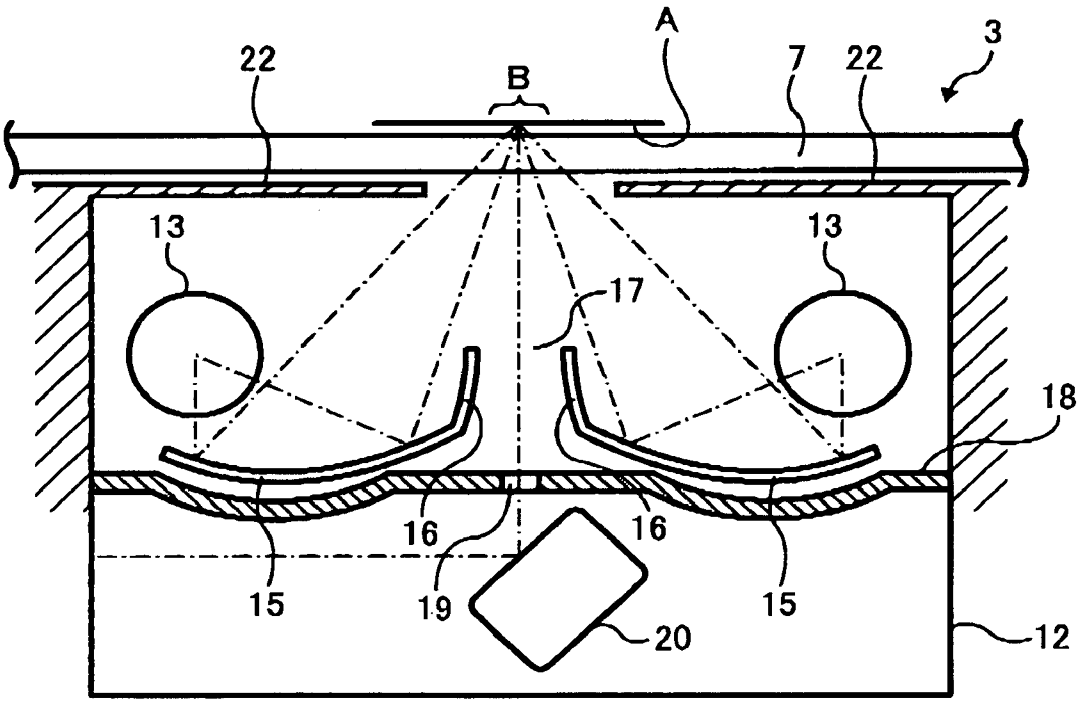
FIG. 4 is a cross-section view of a light source unit employed by an image scanner of the image forming apparatus of FIG. 3.

Referring to FIG. 4, a lighting mechanism of the image scanner 3 is explained. FIG. 4 illustrates a light source unit 12 of the image scanner 3 in cross section. As illustrated in FIG. 4, the light source unit 12 has a twin-lamp system and is disposed under the contact glass 7. The twin-lamp system is to cover a scanning length with two lamps arranged in parallel and in a staggered manner. It may be possible to use a single lamp system or a system using more than two lamps, as an alternative.

As illustrated in FIG. 4, the light source unit 12 includes a pair of lighting tubes 13, a pair of reflectors 15, a separator 18, and a mirror 20. Each of the pair of reflectors 15 includes a camber 16. The separator 18 includes a center hole 19. In FIG. 4, reference numeral 22 denotes a light shielding portion. Also, in FIG. 4, letters A and B denote a surface of an original document to be read and an area to be read in the surface, respectively.

Figure 2:
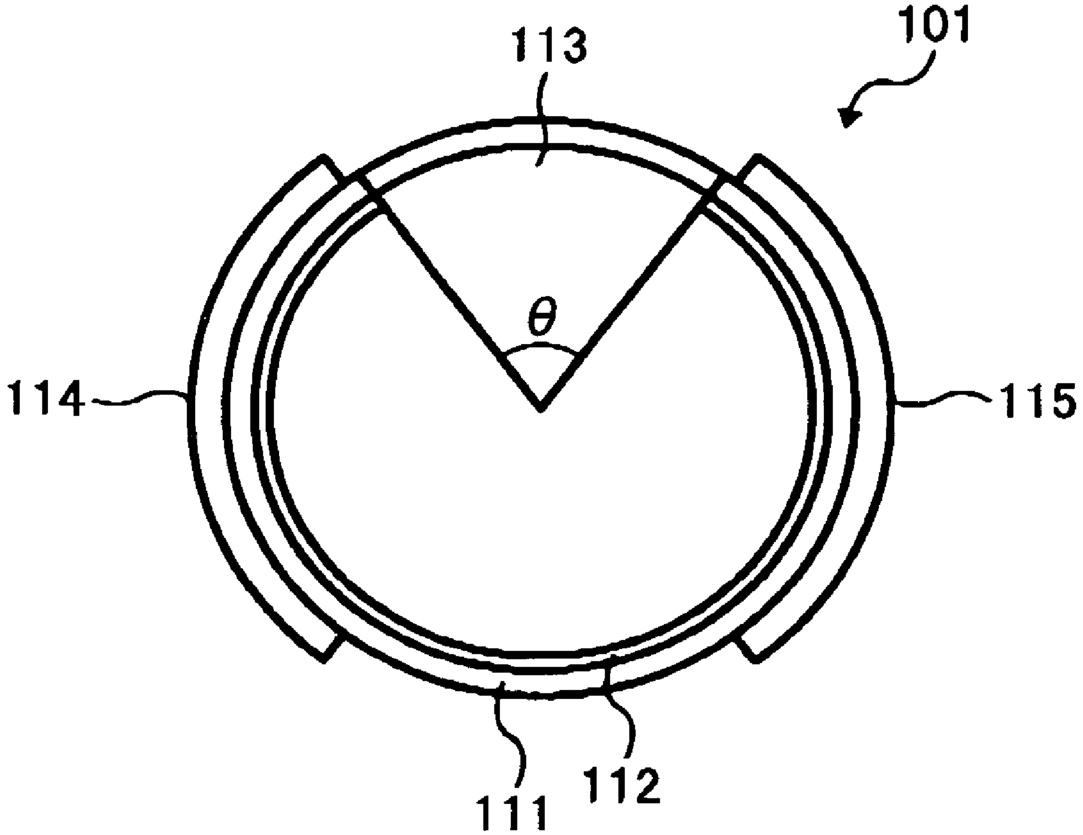
FIG. 2 PRIOR ART
FIG. 2 is a schematic diagram of an example lighting tube used in the background image reading apparatus of FIG. 1.
Figure 5:
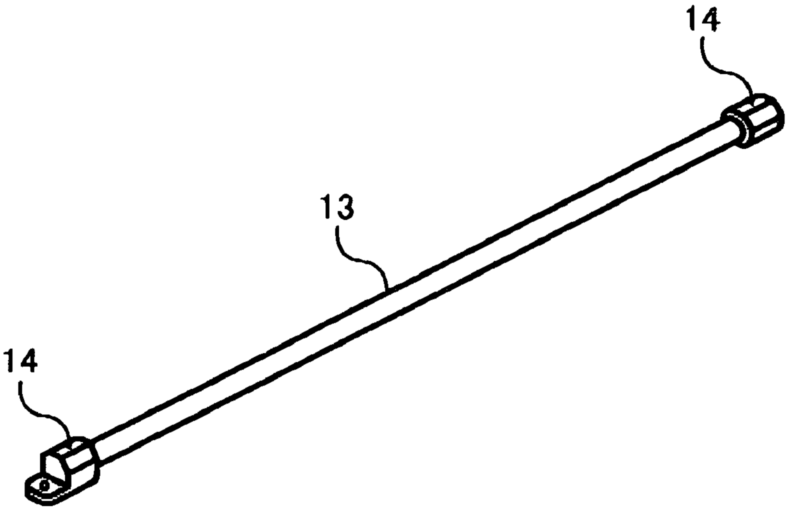
FIG. 5 is an illustration of an example lighting tube used in the light source unit of FIG. 4.

The pair of lighting tubes 13 each are a fluorescent lamp (e.g., a xenon arc lamp) and are arranged in parallel to each other and in a staggered manner so as to provide a lighting length sufficient to cover a predetermined scanning length. Each of the pair of lighting tubes 13 basically has a structure similar to the structure of the xenon arc lamp 101 of FIG. 2. Specifically, each of the pair of lighting tubes 13 encapsulates a xenon gas therein, has an aperture with a predefined angle, and is provided at an outer circumferential surface thereof with electrodes opposite to each other relative to the aperture. As illustrated in FIG. 5, each of the pair of lighting tubes 13 includes holders 14 disposed at opposite ends thereof. With the holders 14, each of the pair of lighting tubes 13 is mounted directly or indirectly to the light source unit 12.

The pair of reflectors 15 are arranged under the pair of lighting tubes 13 and above the separator 18. Each of the pair of reflectors 15 has in part a specific elliptical shape in cross section and is arranged such that the camber 16 is set in a substantially vertical direction and in a vicinity to the center hole 19 of the separator 18. With this arrangement, each of the pair of reflectors 15 can receive a substantially entire light amount emitted from the lighting tube 13 and reflect the light towards a point in the area B of the surface A through an opening formed between the two light shielding portions 22. The light impinges on the point in the area B is reflected along a light passage 17 in a substantially downward plumb direction between the two cambers 16 and through the center hole 19 to impinge on a surface of the mirror 20. In other words, a gap between the two cambers 16 prevents other reflected light than the light running along the light passage 17.

The separator 18 arranged under the pair of reflectors 15 prevents light transmittance to the mirror 20, except for the reflected light running along the light passage 17 through the center hole 19.

The mirror 20 is arranged under the separator 18, specifically under the center hole 19. The mirror 20 has the surface to receive the light reflected from the area B of the surface A along the light passage 17, and this surface is tilted at a predetermined angle.

With the above-described structure, the light source unit 12 can widely receive and reflect the light emitted by each of the pair of lighting tubes 13 with a corresponding one of the pair of reflectors 15. The reflected light is focused on a point in the area B of the surface A of an original document placed on the contact glass 7. The light is further reflected by the point in the area B of the surface A downwardly through the contact glass 7 along the light passage 17. The reflected light goes along the light passage 17 through the gap between the cambers 16 and the center hole 19 and impinges on the surface of the mirror 20. The light impinging on the mirror 20 is further reflected in a predetermined direction to enter into an imaging lens and an image pickup device (not shown), such as a CCD (charge-coupled device). Thus, the image of the original document is optically read through the image pickup device.

In the above-described structure, each of the pair of lighting tubes 13 can be half a length of the entire scanning length, that is, considerably a small size. Similarly, the pair of reflectors 15 corresponding to the pair of lighting tubes 13 on a one-to-one basis each can also be half a length of the entire scanning length. This structure can permit a use of such a small mechanism even in a high-speed image forming apparatus which reads at a high speed and requires a greater amount of light, instead of employing a large-scaled mechanism of a single tube and a reflector. That is, this structure can avoid an upsizing of the light source unit 12.

In addition, the above-described structure can focus almost an entire light amount from each lighting tube 13 to a point in the area B of the surface A. This leads to a prevention of a growing uneven image density in resultant image information read by the image scanner 3. Accordingly, the light source unit 12 can be conductive to an improvement in reproducibility in reading images.

To achieve the above-described superior light focusing, the elliptical shape of each reflector 15 is arranged such that one focal point is placed substantially at the center of the corresponding lighting-tube 13 and the other focal point is placed substantially at a point within the area B of the surface A. In addition, this structure can reduce a light ray that produces flare light.

In addition, this structure improves maintainability with respect to replacement of the two lighting tubes 13. If the two lighting tubes are not the same and different in kind, replacement of the lighting tube may become complicated in preparation and performance. That is, two different kinds of light tubes need to be prepared and to be exchanged in a different manner. However, this structure uses two of the lighting tubes 13 equivalent to each other and therefore one kind of lighting tube 13 needs to be prepared and to be replaced in a common manner.

Furthermore, this structure can cancel a shade due to a surface asperity of an original document since the two same lighting tubes 13 are arranged symmetrically about the light passage 17.

Also, it should be noted that the light shielding portions 22 of this structure contribute to the reduction of flare light. The arrangement of the light shielding portions 22 leads to a further improvement of a reproducibility in reading an original document.

Figure 6:
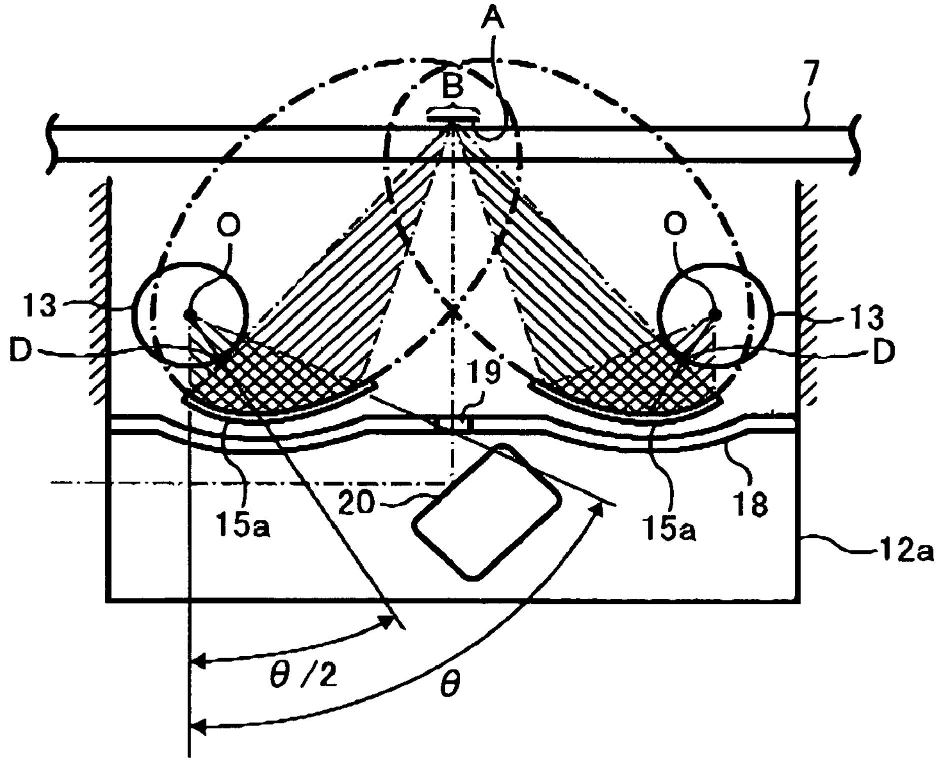
FIG. 6 is a cross-section view of a light source unit according to another embodiment of the present invention.

Referring to FIG. 6, a light source unit 12*a* according to another example embodiment of the present invention is explained. The light source unit 12*a* of FIG. 6 is similar to the light source unit 12 of FIG. 4, except for a pair of reflectors 15*a*. In each of the pair of lighting tubes 13, the aperture has an angle θ, as described above. The surface of the lighting tube 13 has a point D at half the aperture angle θ. Each of the pair of reflectors 15*a* is arranged such that one focal point thereof is set at a point on a line having the center of the lighting tube 13 and the point D thereon, as close to the point D as possible, and the other focal point is set at a point in the area B of the surface A.

Figure 7:
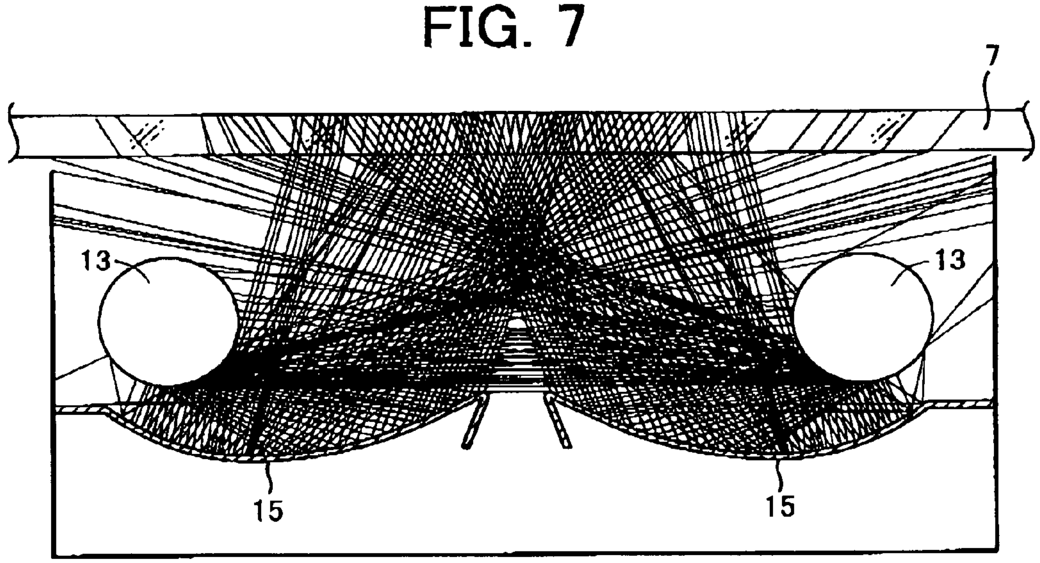
FIG. 7 is a schematic diagram illustrating a light reflection status of the light source unit of FIG. 4.
Figure 8:
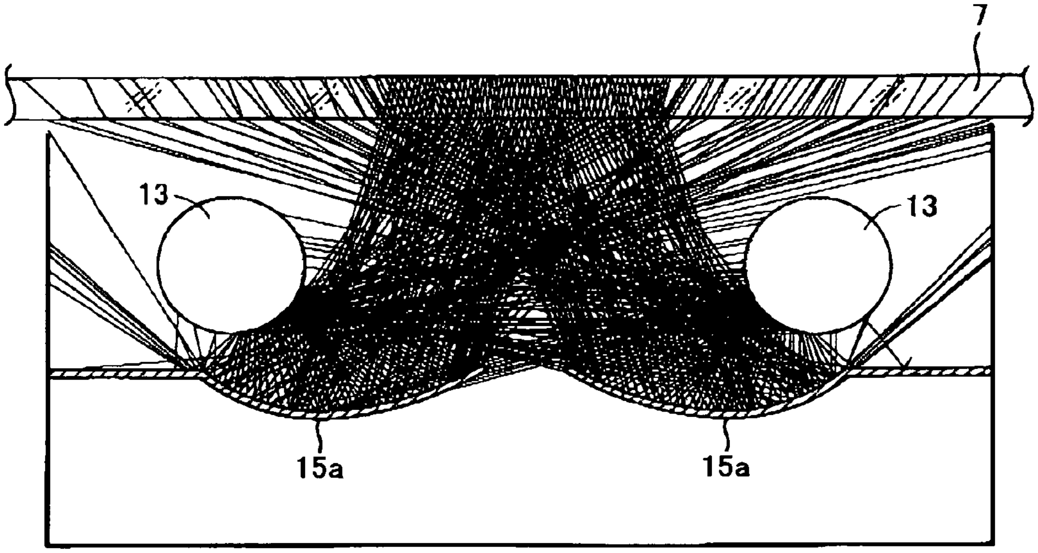
FIG. 8 is a schematic diagram illustrating a light reflection status of the light source unit of FIG. 6.

FIG. 7 illustrates a state of light reflection in a light source unit having settings of the reflectors 15 same as the light source unit 12 of FIG. 4. FIG. 8 illustrates a state of light reflection in the light source unit 12*a* of FIG. 6. From these figures, it is obvious that the light source unit 12*a* gathers the light in a more intensive manner than the light source unit 12. Therefore, the light source unit 12*a* can provide an increased light amount to the surface A of the original document to read. This makes it possible to downsize the reflection area of the reflector 15*a*. Therefore, this structure of FIG. 6 can contribute to a downsizing of the light source unit 12*a*.

Figure 9:
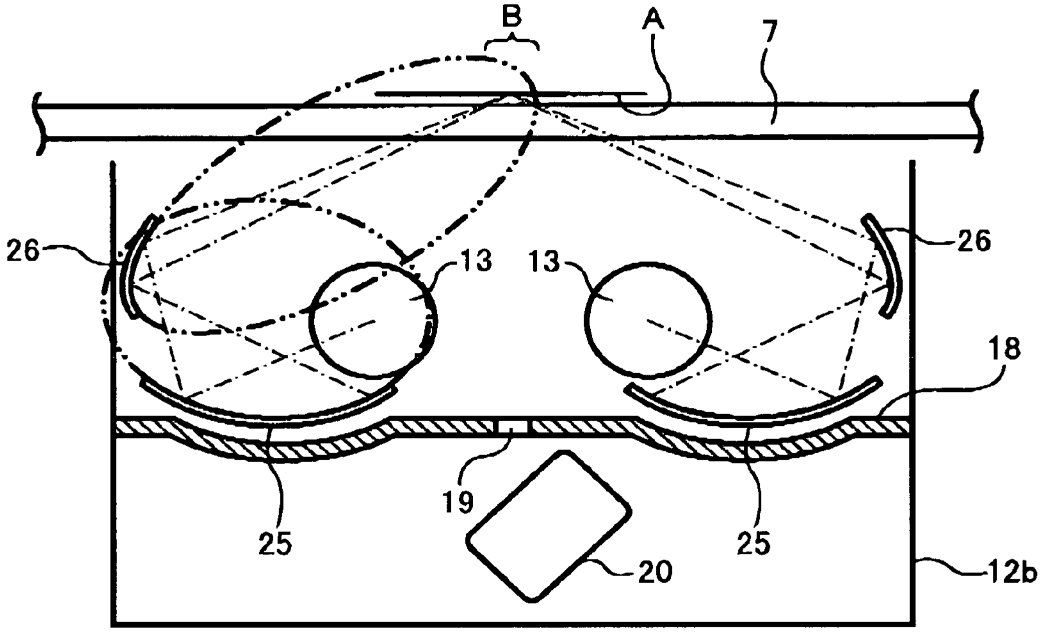
FIGS. 9 and 10 are cross-section views of a light source unit according to another embodiment of the present invention.

Referring to FIG. 9, a light source unit 12*b* according to another example embodiment of the present invention is explained. The light source unit 12*b* of FIG. 9 is similar to the light source unit 12 of FIG. 4, except for a pair of main reflectors 25 and a pair of sub reflectors 26 for two light reflection systems.

In each light reflection system of FIG. 9, the main reflector 25 has a first end disposed at a position facing the light passage 17 and under the lighting tube 13 and a second end disposed at a position facing the lighting tube 13 and the light passage 17 in a same direction. Also, the sub reflector 26 is disposed over the second end of the main reflector 25. The main reflector 25 and the sub reflector 26 are arranged at positions such their focal points are substantially at a common point. Furthermore, the other focal point of the main reflector 25 is set substantially at the center of the lighting tube 13, and the other focal point of the sub reflector 26 is set substantially at a point in the area B of the surface A.

With this arrangement, the main reflector 25 receives and reflects the light emitted by the lighting tube 13 toward the sub reflector 26. The sub reflector 26 receives and reflects the light reflected by the main reflector 25 toward a point in the area B of the surface A. This structure avoids various undesirable light rays such as a flare of light, a radiation of light directly from the lighting tube 13 to the surface A, and a diffusion of light to areas other than the area B. Therefore, the light source unit 12*b* provides an efficient light reflection system. In other words, the light source unit 12*b* can be downsized even in a high-speed image forming apparatus which reads at a high speed in need of a greater amount of light, and can achieve an improvement of reproducibility in reading an original document.

Figure 10:
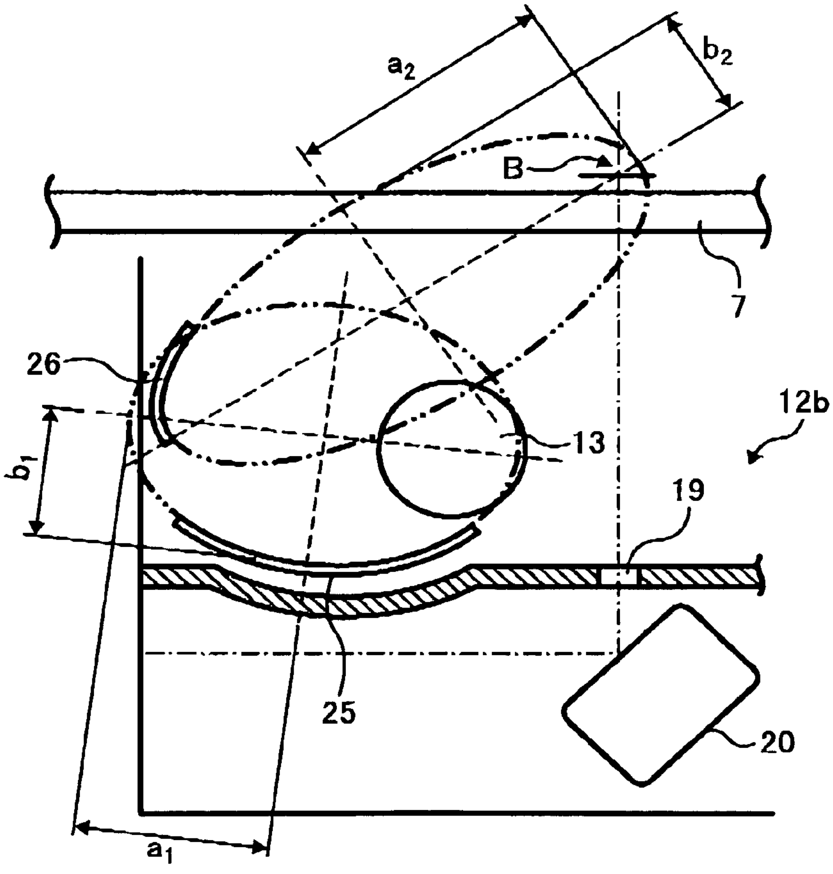

FIG. 10 illustrates one of the light reflection system of the light source unit 12*b*. As illustrated in FIG. 10, major and minor axes of the main reflector 25 are set as an x-axis and a y-axis, respectively. When the main reflector 25 has a major axis $a_1$ and a minor axis $b_1$, the shape of the main reflector 25 can be expressed by an equation of $(x^2/a_1^2)\times(y^2/b_1^2)=1$. In a similar manner, major and minor axes of the sub reflector 26 are set as an x-axis and a y-axis, respectively. When the sub reflector 26 has a major axis $a_2$ and a minor axis $b_2$, the shape of the sub reflector 26 can be expressed by an equation of $(x^2/a_2^2)\times(y^2/b_2^2)=1$.

In the above equations, it is preferable to maintain relationships of $a_1>b_1$ and $a_2>b_2$ as well as $a_1>a_2$ and $b_1>b_2$ so as to efficiently eliminate a radiation of light to other points than the point in the area B. Thereby, the light source unit 12*b* can be made in a compact size.

The above-described light source units can be applied to various kinds of image scanning systems such as a sheet scanning image reader and a book scanning image reader. The sheet scanning image reader is a type in which the light source unit is fixed at a specific position and an original document is moved so that an image is sequentially read. The book scanning image reader is a type in which an original document is stayed at a reading position and the light source unit is moved to sequentially read an image.

Numerous additional modifications and variations are possible in light of the above teachings. It is therefore to be understood that within the scope of the appended claims, the disclosure of this patent specification may be practiced otherwise than as specifically described herein.

What is claimed is:

1. A light source apparatus, comprising:

at least one lighting tube including an aperture; and at least one reflector including a main reflector configured to collectively receive light from the at least one lighting tube and a sub reflector configured to collectively receive the light from the main reflector and to reflect the light toward a point in a reading area in a surface of an original document to be read, the at least one reflector each arranged at a position in a vicinity to and corresponding to the at least one lighting tube on a one-to-one basis, to gather the light emitted through the aperture by the at least one lighting tube to focus the light on the point in the reading area in the surface of the original document to be read, each of the at least one reflector having an elliptical shape.

2. The light source apparatus of claim 1, wherein the main reflector and the sub reflector are arranged such that a focal point of the elliptical shape of the main reflector and a focal point of the elliptical shape of the sub reflector are set at a common point.

3. The light source apparatus of claim 1, wherein the at least one lighting tube is a plurality of lighting tubes; and the at least one reflector is a plurality of reflectors.

4. The light source apparatus of claim 3, wherein the plurality of lighting tubes are spaced closer together than the plurality of reflectors.

5. The light source apparatus of claim 1, wherein a major axis of the main reflector is set as an x-axis and a minor axis of the main reflector is set as a y-axis, the main reflector has a major axis $a_1$ and a minor axis $b_1$, and the shape of the main reflector is configured to satisfy $(x^2/a_1^2)\times(y^2/b_1^2)=1$.

6. The light source apparatus of claim 1, wherein a major axis of the sub reflector is set as an x-axis and a minor axis of the sub reflector is set as a y-axis, the sub reflector has a major axis $a_2$ and a minor axis $b_2$, and the shape of the sub reflector is configured to satisfy $(x^2/a_2^2)\times(y^2/b_2^2)=1$.

7. An image scanning apparatus, comprising the light source apparatus of claim 1.

8. An image forming apparatus, comprising the image scanning apparatus of claim 7.

9. light source apparatus, comprising:

at least one lighting tube including an aperture; and at least one reflector including a camber for preventing entrance of light other than light reflected by a point in a reading area in a surface of an original document to be read, each of the at least one reflector arranged at a position in a vicinity to and corresponding to the at least one lighting tube on a one-to-one basis, to gather light emitted through the aperture by the at least one lighting tube to focus the light on a point in the reading area in the surface of the original document to be read, and each of the at least one reflector having an elliptical shape.

10. An image scanning apparatus, comprising the light source apparatus of claim 9.

11. An image forming apparatus, comprising the image scanning apparatus of claim 10.

* * * * *